Patented June 11, 1929.

1,716,828

UNITED STATES PATENT OFFICE.

JOHN C. MERRILL, OF LOS ANGELES, AND HENRY S. MONTGOMERY, OF PASADENA, CALIFORNIA.

METHOD OF PRODUCING CLARIFYING REAGENTS.

No Drawing.   Application filed August 10, 1927.   Serial No. 212,138.

This invention relates to the art of clarifying or decolorizing liquids such as oils of various natures; and although the reagent herein described is not necessarily limited in its use to the oils hereinafter particularly spoken of, it has been found peculiarly effective as applied to vegetable oils such as cotton-seed or linseed and to mineral oils such as petroleum and petroleum derivatives.

Methods for the purification and decolorizing of oils are well known, and need no extensive description here. It is typical, for instance, that a petroleum derivative or distillate be acid treated, the resultant acid sludge removed, the remaining acidity neutralized, and the oil finally clarified or decolorized by using an adsorbent solid material such as fuller's earth, charcoal, etc. It has been found that certain natural clays can be used for the final clarification without any artificial preparation of the clay. On the other hand it has been found that certain clays are greatly increased in efficiency if they are first treated with a suitable acid, as sulphuric acid. What change in the clay is brought about by acid treatment is perhaps not known in full detail; but it is generally recognized that upon acid treatment of a clay, whose adsorbent or coagulating efficiency can be improved by such acid treatment, certain well recognized chemical changes take place in the constitution of the clay.

Such acid treatment of selected clays is rather expensive, involving as it does an initial selection of an appropriate clay, the treatment of the clay while wet, and its final washing and drying; all of such operations having to be carried on with care and under certain known conditions in order to obtain the desired final results. Also the amount of acid required is comparatively large.

It is an object of our invention to provide a new form of "activated" clay, capable of producing results at the highest efficiency, but producible at comparatively small cost.

Fundamentally we accomplish our object by using an electrolyte or, as might be otherwise expressed, by converting the clay itself into an electrolyte. Use of an electrolyte for the purpose of coagulating matters in suspension in fluids is not in itself new. The effect of an appropriate electrolyte upon suspended or colloidal substance is known. Also it has been proposed to use a dry mixture of clay with an electrolyte, treating the oil with electrolyte, treating the oil with the mixture. And it is of course well recognized that the sulphuric acid with which clays are now treated is itself an electrolyte. Our invention therefore does not comprise such general applications of an electrolyte to a liquid to be clarified; but it does involve a peculiar, simple and inexpensive application of the electrolytic action to clays of a suitable class. In contradistinction to the direct use of an electrolyte either alone or mixed with clay, our procedure involves, not the direct use of an original electrolyte, but the use of a clay which has been given electrolytic characteristics. And in contradistinction to the use of an acid treated clay, our invention proposes the use of a clay which has been treated with an electrolyte that has no reaction upon the clay to change its chemical constitution. Although an acid treated clay may have an electrolytic action, such a treated clay is expensive to produce; and we surmise that its relatively high cost is due to the fact that a great portion of the required acid is expended in chemical reaction upon the clay. In contradistinction, we treat our clay with an electrolyte that has not reaction upon the clay to change its chemical constitution, and we find that an apparently very small amount of electrolyte suffices to give a large amount of clay very high decolorizing and clarifying efficiency.

For our purposes we have found that substantially any kind of aluminum silicate clay is suitable, but preferably one that is not highly hydrated. Working with clays of that nature, and preparing them for the purpose of removing the usual discolorings from mineral or vegetable oils, we find such electrolytes as aluminum sulphate or sodium or potassium bisulphate, or boric acid, to be as good as any we have tried; and so therefore use aluminum sulphate as an example.

Having first ground or otherwise divided the clay to a suitable small size, it is next treated with a solution of the electrolyte. In thus treating the clay with the electrolytic solution we prefer not to use such a large amount of the solution that treated clay must afterwards be filtered off; but prefer thoroughly to mix the clay with such an amount of the solution as to form a plastic mass of suitable consistency for forming into bricks of any suitable size and shape. Forming into bricks by pressure then forces the solution more thoroughly into the clay particles, and the brick formation lends itself readily to the next operation of drying out all excess moisture; after which the dried bricks are again ground to suitable fineness, and the ground product is then ready for use in the oil clarification process. Any suitable machinery may be used for carrying on the mechanical operations. Crushers or grinders of any suitable form may be used; a pug mill or mixer of any suitable type may be used for mixing the plastic mass; and any kind of briquetting or compressing machine may be used for forming the bricks. Likewise any suitable form of dryer may be used. The nature of the machinery is of no consequence so far as our invention is concerned.

For certain purposes, as hereinafter pointed out, it is just as well, or sometimes better, that, after treatment with the electrolytic solution, the electrolyte remaining the clay particles shall be washed out cleanly. This may be done either by washing the dried ground product produced as above described, and subsequently re-drying the washed clay; or the briquetting and first drying of the product may be dispensed with, the wet treated clay being immediately washed in a surplus of clean water, and then filtered out, dried, and re-ground. But many such mechanical variations will occur to others and are well within the skill of any one versed in this art.

A characteristic feature of our invention resides in the fact that we treat the clay with a more or less dilute solution of an electrolyte such as described, and in such proportions (clay to electrolyte) that the amount of electrolytic substance actually applied to the clay is comparatively small. For instance, we use an electrolytic solution of about six percent of the electrolyte in water; and then in mixing the solution with the clay we use, say, one-half solution, by weight, to clay, so that the amount, by weight, of electrolyte, that finally affects the clay, is typically about three percent. In fact, we find that, for the treatment of average petroleum or vegetable oils, the best results are obtained when the clay has been treated with about 2½% to 3% of its weight of electrolyte. The limits appear to be about 2% minimum and about 5% maximum, the efficiency falling off if either of these limits are much exceeded. The clay, thus treated, is then dried of all surplus moisture and ground to suitable fineness for use. However, as we have stated before, we find that, after the clay has been treated, all of the electrolyte can be cleanly and completely washed out before the clay is finally dried and prepared for use; and, generally speaking, the efficiency of such a clay, from which all the original electrolyte has been removed is equal to that of clay which still contains the small amount of original electroylte. If a large percentage of electrolyte, say five percent, has been used it is usually found necessary to wash the electrolyte out, or at least to wash it down to a smaller percentage; and in some special cases, notably for the treatment of cotton-seed and other vegetable oils, it is necessary to wash out the electrolyte to get good results, even though only a small percentage has been used. These facts lead us to believe that the clay, by the described electrolytic treatment, has been itself transformed into an electrolyte; so that in final use it has its original adsorbent qualities, and also its weight quality that tends to settle its collected coagulation; and it has additionally its imparted electrolytic quality which increases the power of coagulating the decolorizing particles in the liquid and also gives it power of causing coagulation of the clay particles themselves.

It is another peculiarity, discovered by us, that as a general rule, an increase or decrease, above or below the approximate limits given, in the amount of original electrolyte with which the clay is actually treated (the amount of electrolyte that comes into intimate or penetrating contact with the clay) causes decrease in the final effectiveness of the electrolyzed clay. And these facts again point to the purely electrolytic nature of the actions taking place. However, the percentage of electrolyte in the treating solution—the degree of dilution of that solution—has no particular effect on the final results. So far as final clay efficiency is concerned, we might use, for instance, equal weights of clay and a three percent solution or two parts clay, by weight, to one part of a six percent solution. But the use of the smaller amount or more concentrated solution is advantageous in effectively treating the clay; because then all the solution, and therefore, all the electrolyte comes into immediate and intimate contact with the clay, and the moistened clay can be formed into bricks with the attendant advantages.

We claim:

1. The method of preparing an aluminum silicate clay for use as a liquid decolorizer, that includes treating the clay with a solution of an electrolyte that does not change the chemical constitution of the clay.

2. The method of preparing an aluminum silicate clay for use as a liquid decolorizer, that includes treating the clay with a dilute solution of an electrolyte that does not change the chemical constitution of the clay, the amount of electrolyte being not more than approximately five per cent of the clay by weight.

3. The method of preparing an aluminum silicate clay for use as a liquid decolorizer, that includes treating the clay with a dilute solution of an electrolyte that does not change the chemical constitution of the clay, the amount of electrolyte being between approximately two and five percent of the clay by weight.

4. The method of preparing an almuinum silicate clay for use as a liquid decolorizer, that includes treating the clay with a solution of an electrolyte that does not change the chemical constitution of the clay, then drying out all excess water from the clay, and dividing it to suitable fineness.

5. The method of preparing an aluminum silicate clay for use as a liquid decolorizer, that includes treating the clay with a dilute solution of an electrolyte that does not change the chemical constitution of the clay, the amount of electrolyte being not more than approximately five percent of the clay by weight, then drying out all excess water from the clay, and dividing it to suitable fineness.

6. The method of preparing an aluminum silicate clay for use as a liquid decolorizer, that includes treating the clay with a dilute solution of an electrolyte that does not change the chemical constitution of the clay, the amount of electrolyte being between approximately two and five percent of the clay by weight, then drying out all excess water from the clay, and dividing it to suitable fineness.

7. The method of preparing an aluminum silicate clay for use as a liquid decolorizer, that includes mixing the clay with a solution of an electrolyte that does not change the chemical constitution of the clay, the proportion of clay to solution being such as to form a plastic mixture in which all the solution is in intimate contact with the clay.

8. The method of preparing an aluminum silicate clay for use as a liquid decolorizer, that includes mixing the clay with a solution of an electrolyte that does not change the chemical constitution of the clay, the proportion of clay to solution being such as to form a plastic mixture in which all the solution is in intimate contact with the clay, the proportion of electrolyte to solvent in the solution being such that the proportion of electrolyte to clay by weight does not exceed approximately five percent.

9. The method of preparing an aluminum silicate clay for use as a liquid decolorizer, that includes mixing the clay with a solution of an electrolyte that does not change the chemical constitution of the clay, the proportion of clay to solution being such as to form a plastic mixture in which all the solution is in intimate contact with the clay, the proportion of electrolyte to solvent in the solution being such that the proportion of electrolyte to clay by weight is between approximately two and five percent.

10. The method of preparing an aluminum silicate clay for use as a liquid decolorizer, that includes mixing the clay with a solution of an electrolyte that does not change the chemical constitution of the clay, the proportion of clay to solution being such as to form a plastic mixture in which all the solution is in intimate contact with the clay, then forming the plastic mixture by pressure into a brick, drying and grinding.

In witness that we claim the foregoing we have hereunto subscribed our names this 14th day of July, 1927.

JOHN C. MERRILL.
HENRY S. MONTGOMERY.